AUTOMATIC TELEPHONY RINGING CIRCUIT

Filed Oct. 4, 1956 3 Sheets-Sheet 1

INVENTOR.
WILLIAM W. PHARIS
BY
ATTORNEY

TRUNK CIRCUIT 103

Feb. 14, 1961 W. W. PHARIS 2,972,019

AUTOMATIC TELEPHONY RINGING CIRCUIT

Filed Oct. 4, 1956 3 Sheets-Sheet 3

United States Patent Office 2,972,019

Patented Feb. 14, 1961

2,972,019

AUTOMATIC TELEPHONY RINGING CIRCUIT

William W. Pharis, Rochester, N.Y., assignor to General Dynamics Corporation, Rochester, N.Y., a corporation of Delaware Filed Oct. 4, 1956, Ser. No. 616,317

8 Claims. (Cl. 179—18)

This invention relates to automatic telephone systems and more particularly to signaling means for use in such telephone systems.

In general, it is old to provide means for extending signals through telephone systems to indicate the presence of unanswered calls. One form of such signaling is a ringing current which may be transmitted as periods or splashes of ringing current separated by intervals during which no ringing current is transmitted, hereinafter called "interrupted ringing current." Among other things, interrupted ringing current may cause certain telephone equipment such as trunk circuits, for example, to respond to and give indication of the presence of unanswered calls to a person or persons who may be responsible for answering them. Also, this telephone equipment may be adapted to trip ringing current responsive to answer—or stated otherwise, to cause the ringing current to be removed or discontinued after the call is answered. If calls are answered during silent periods, ringing current may be tripped in any suitable manner without further complications; however, if calls are answered during periods when ringing current is applied, it may be possible that the ringing current may cause annoyance or even pain to the ears of persons who hear it. Therefore, it is desirable to provide means for eliminating this possibility that ringing current may be heard.

An object of this invention is to provide new and improved trunk circuits.

Another object of this invention is to provide new and improved means for responding to ringing signals.

Still another object of this invention is to provide new and improved means for controlling the extension of ringing current toward attendant's cabinets.

Still another object of this invention is to provide means for preventing the extension of ringing current from annoying persons who may answer calls at attendant's cabinets.

The subject invention accomplishes the above-cited and other objects by providing means for extending interrupted ringing current over talking conductors toward an attendant's cabinet during a ringing period, means for responding to such current to signal the attendant, and means for blocking the extension of such current to the attendant's headset, as by breaking the talking conductors in a preceding trunk circuit for the duration of the ringing period so that the answering attendant cannot be "rung in the ear."

Further objects and advantages of the invention will become apparent as the following description proceeds, and the features of novelty which characterize the invention will be pointed out with particularity in the claims annexed to and forming part of this specification. Next, reference is made to the attached drawings in which:

Fig. 1 shows by block diagram a telephone system which may utilize the subject invention;

Figs. 2 and 3, when properly joined, show details of a trunk circuit which is also shown in Fig. 1 by means of rectangle 103; and, Fig. 4 shows the manner in which Figs. 2 and 3 should be joined to provide a complete and understandable circuit.

The following specification uses simple and specific terms where possible to facilitate an understanding of the invention; however, it should be understood that the use of these simple and specific terms is not to act in any manner as a disclaimer of the full range of equivalents which is normally given under established rules of patent law. To illustrate, the attached drawings show the source of office potential by means of plus (+) and minus (−) signs. As in most telephone systems, the plus terminal is described as being at ground potential; however, it should be understood that either this or any other suitable power supply may be used. Still further, the heavily inked rectangle 103 indicates that portion of the system which is shown in detail by means of Figs. 2 and 3. The remaining blocks of Fig. 1 that are shown by lightly inked rectangles are items which are well known to those skilled in the art. Any suitable equipment may be used to provide the functions represented by these blocks. In other types of telephone systems, the necessary functions may be provided without using the particular structures shown in Fig. 1, such as line finders, selectors, connectors, and the like. Quite obviously, other examples could be selected to illustrate the manner in which the specific items that are shown and described herein are entitled to a wide range of equivalents.

BRIEF DESCRIPTION

Fig. 1 shows, by block diagram, one example of a telephone system which is useful for explaining the manner in which the invention operates. According to this figure, a subscriber at station A may call a subscriber at station B by means of conventional circuits. For example, line circuit 120, allotter 121 and line finder 122 may cooperate to find the calling line. Thereafter a subscriber at station A may dial a suitable directory number so that selector 123 may operate to seize idle equipment, and connector 124 may operate to complete a connection to line circuit 125 and called subscriber station B. On the other hand, if a subscriber at station A should wish to call a subscriber at station C, the digit or digits which are dialed into selector 123 may be effective for extending a call over trunk line TK31, trunk circuit 107, and through automatic telephone equipment 105 to subscriber station C. If still another directory number is dialed, the call may be extended to operator 106.

On calls to trunk circuit 103 from distant office 104 (hereinafter called "incoming calls"), a subscriber at station C may utilize automatic telephone equipment 105 and trunk circuit 107 for extending calls over trunk line TK31, or operator 106 may utilize any suitable equipment (not shown) for extending calls through trunk circuit 107 and over trunk line TK31. In either event, ringing current may be transmitted to trunk circuit 103 for indicating that there is an unanswered call. More particularly, ringing current may be transmitted over a circuit which includes one or more conductors of trunk line TK31, to a suitable response device, such as the winding of ring relay 250, for example. Ring relay 250 is adapted to respond to this ringing current and close its contacts 251 for operating a second ring relay 240. Responsive to operation of relay 240, contacts 241 and 245 open thus breaking a circuit including the talking conductors over which ringing current might otherwise be extended to attendant's cabinet 102. Upon observing a suitable signal (not shown in Fig. 1), an attendant may connect cord circuit 101 to jack J21 thereby answering a call.

If this answer is during a period when the ringing current is interrupted, i.e., not applied to the line, ground is extended over the sleeve of jack J21 and the winding of sleeve relay 210 to (−) battery. When relay 210 operates, contacts 215 open to break a locking circuit to ring relay 240 thus allowing it to restore. Upon restoring, relay 240 closes its contacts 241 and 245 thereby completing a talking circuit.

On the other hand, if answer is during a period when ringing current is not interrupted, i.e., is extended over trunk line TK31 to trunk circuit 103, contacts 215 open but have no effect because ring relay 250 is being held operated by the ringing current. Contacts 251 are closed and ring relay 240 remains in an operated condition, thus holding contacts 241 and 245 open so that the attendant may not hear the ringing current. When the ringing current terminates, ring relay 250 restores thus opening contacts 251. Since the call has been answered, a second or locking circuit for operating ring relay 240 is broken at contacts 215; therefore, ring relay 240 restores. Contacts 241 and 245 close to complete a telephonic communication circuit from the attendant to the distant office.

Thus, it is seen that means is provided for extending calls from a first point, such as trunk circuit 107, for example, to a second point, such as attendant's cabinet 102, for example, via the talking conductors of trunk line TK31 and trunk circuit 103, and that ringing current responsive means such as relay 240, for example, operates contacts 241 and 245 to disconnect the talking conductors from the attendant's cabinet thereby preventing the extension of ringing current to the second point.

DETAILED DESCRIPTION

Figure 2:
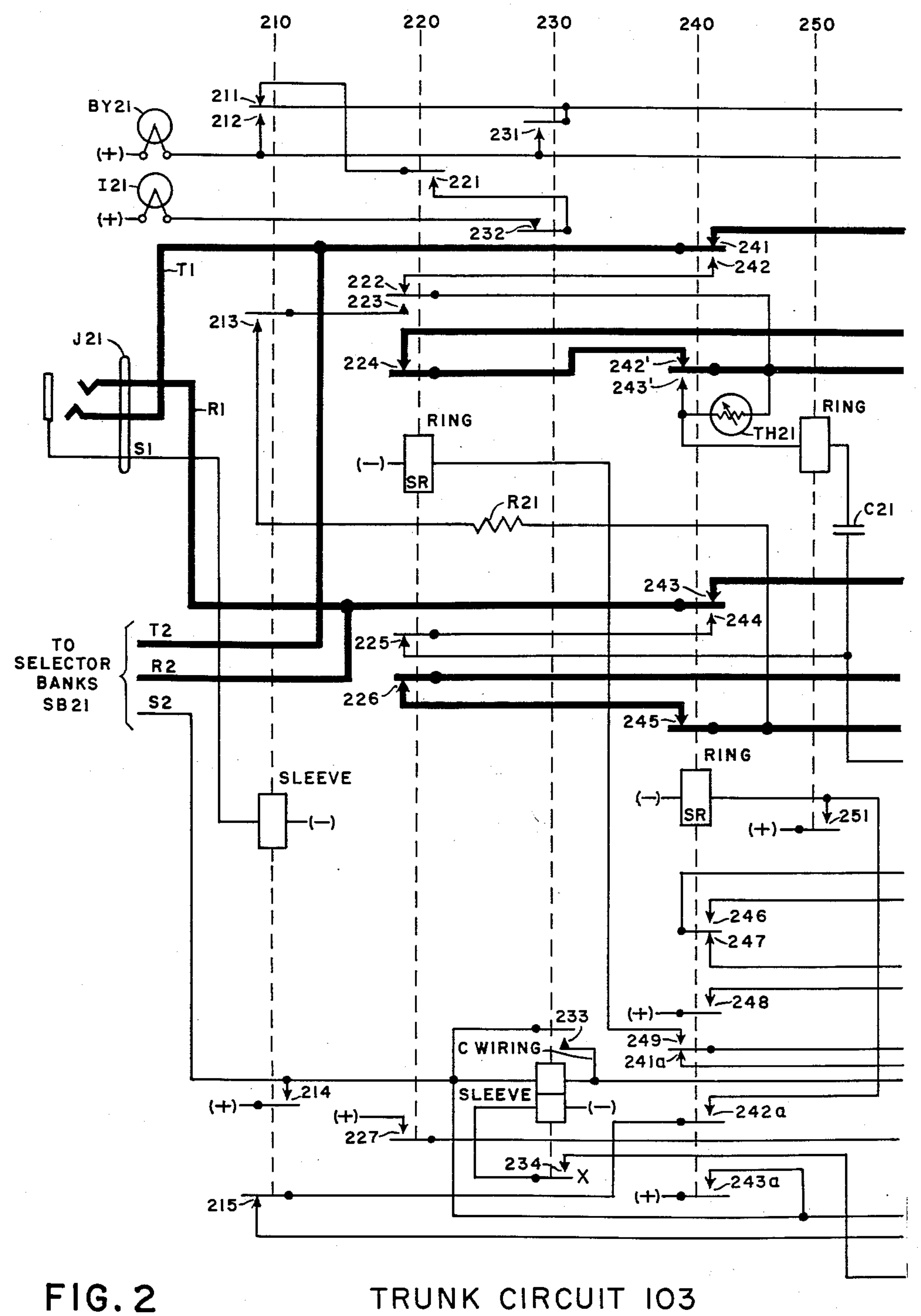
Figure 3:
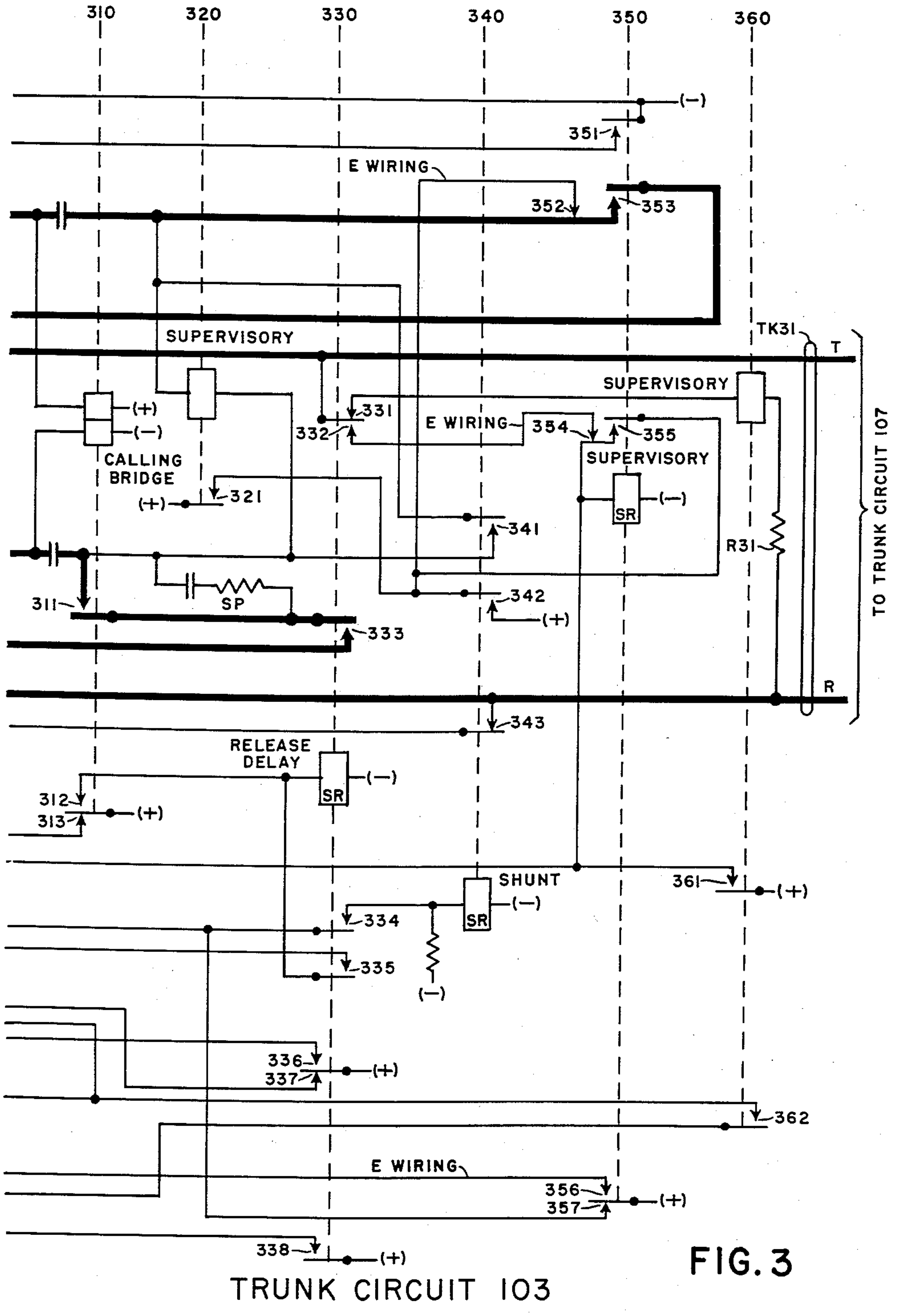

It is thought that a more complete understanding of this invention may be had by making reference to the detailed description of the circuit shown in Figs. 2 and 3.

*Incoming call from a distant office*

The first call to be described is one which is incoming from a distant office over trunk line TK31 (upper right-hand corner of Fig. 3) to a local attendant who answers by plugging into jack J21 (upper left-hand corner of Fig. 2).

*Seizure.*—A seizure signal may be transmitted from the distant office by any suitable means, such as by the application of a ground (+) marking (not shown) to tip conductor T, for example. Responsive thereto, supervisory relay 360 operates over a circuit that may be traced from conductor T through contact 331, the winding of supervisory relay 360, resistor R31, and ring conductor R to (−) battery in the distant office (not shown).

A second supervisory relay 350 operates over an obvious circuit when relay 360 closes its contacts 361. Responsive thereto, contacts 356 close to mark sleeve conductor S2 by a ground (+) potential, thereby indicating a busy condition in selector banks SB21. Contacts 355 prepare a locking circuit for supervisory relay 350, while contacts 353 extend tip conductor T, and contacts 351 close to light busy lamp BY21 over an obvious circuit.

*Ringing.*—After seizure, any suitable equipment (not shown) may extend ringing current over trunk line TK31 to operate ring relay 250, the circuit extending from conductor T through thermistor TH21, the winding of ring relay 250, capacitor C21, and contacts 343 to ring conductor R. The thermistor TH21 is provided to give a time delay so that relay 250 is not operated by transients and voice currents which may be at the same frequency as the ringing current. After the expiration of this time delay period, ring relay 250 operates and closes its contacts 251 to operate ring relay 240 over an obvious circuit.

When ring relay 240 operates, contacts 241, 242′, 243 and 245 open to break the talking circuit so that ringing current may not be extended further. Contacts 242 and 244 have no function at this time. Contacts 243′ close to shunt thermistor TH21, thereby protecting it against excessive wear. Contacts 246 close an alternate circuit for supervisory relay 350 which may be traced from ground (+) on contacts 313 through contacts 246 and the winding of supervisory relay 350 to (−) battery. Contacts 248 have no function at this time. Relay 240 also prepares a locking path for itself at contacts 242*a* and applies an alternate ground (+) marking to sleeve conductor S2 at contacts 243*a*. Contacts 249 close to operate ring relay 220 over the circuit extending from ground (+) on contacts 337 through operated contacts 249 and the winding of ring relay 220 to (−) battery.

Upon operating, ring relay 220 closes contacts 227 to complete a locking circuit for relay 240 which may be traced from ground (+) through contacts 227, 362, 215, 242*a*, and the winding of ring relay 240 to (−) battery. Contacts 226 and 224 operate to open still another point in the talking conductors. Contacts 222 and 225 have no function at this time. Incoming lamp I21 is lit when contacts 221 close to complete a circuit which extends from (−) battery through contacts 211, 221, 232, and the filament of lamp I21 to ground (+).

Briefly in resume, a call has been described as extended over trunk line TK31 from a distant office to trunk circuit 103 which has been marked as busy by busy lamp BY21. Further, trunk circuit 103 has been marked as busy in the selector bank access SB21 by ground (+) which is applied to conductor S2 at contacts 356 and 243*a*. Incoming lamp I21 is lit to signal the presence of an unanswered incoming call, the lighting circuit being under the control of relay 220 which is locked in an operated condition at this time. Thereafter, there is no effect from ring relay 250 as it may operate and release responsive to interrupted ringing current which may be received from the distant office.

*Answer.*—An attendant observes that incoming lamp I21 is lit and proceeds to answer the call that is being described by plugging any suitable plug-ended equipment (not shown in Fig. 2) into jack J21. Among other things, the plug and associated equipment may be adapted to apply ground (+) to sleeve conductor S1, thereby operating sleeve relay 210 over an obvious circuit. Responsive thereto, contacts 211 open to extinguish incoming lamp I21 and contacts 212 close to complete another circuit to busy lamp BY21. Ringing is tripped when contacts 213 close to connect resistor R21 across conductors T and R via the circuit which may be traced from conductor T through contacts 223, 213, resistor R21 and conductor R, whereupon equipment (not shown) in the distant office responds by removing interrupted ringing current. Contacts 214 close to apply still another busy marking to conductor S2. Contacts 215 open a point in the locking circuit that leads to ring relay 20.

Means is provided to keep an attendant from hearing ringing current if a call is answered during a period when interrupted ringing current is applied to conductors T and R. If it is assumed that the call is answered at a time when ringing current is applied, ring relay 250 is operated over a circuit extending from conductor T through contacts 243′, the winding of relay 250, capacitor C21 and contacts 343 to ring conductor R. As long as ring relay 250 is operated, contacts 251 remain closed to hold ring relay 240 which in turn holds open contacts 241, 242′, 243 and 245 to forestall the extension of ringing current to conductors T1 and R1, thereby eliminating any possibility that the attendant might hear the ringing current. Upon the termination or interruption of ringing current, or if the call is answered during a silent period, ring relay 250 is released. Responsive thereto, contacts 251 open to de-energize ring relay 240 which releases after its slow release time period because its locking circuit is open at contacts 215 due to the attendant having answered, as explained above. When ring relay 240 restores, contacts 249 open thereby de-energizing another ring relay 220. Relays 240 and 220 are slow release relays, thereby allowing enough time to be sure that the ringing is tripped in the distant office.

Returning to the restoration of ring relay 240, contacts 241 and 243 close, thereby operating calling bridge relay 310 over a circuit which may be traced from ground (+) through the upper winding of calling bridge relay 310, resting contacts 241, conductor T1, jack J21, equipment (not shown) and back to jack J21, rest contacts 243 and the lower winding of calling bridge relay 310 to (—) battery. Contacts 243' have no effect at this time.

When ring relay 220 restores, contacts 221 open to extinguish incoming lamp I21. Contacts 224 and 226 close, thus completing another point in the talking circuit (the heavily inked conductors) which extends from trunk TK31 to jack J21. Relay 220 also opens contacts 223 to disconnect the ring-tripping control resistor R21 which had been connected across conductors T and R, as explained above.

When calling bridge relay 310 operates responsive to the restoration of ring relay 240, as explained above, contacts 312 close thereby completing an obvious circuit for operating release delay relay 330. Contacts 311 close to complete still another point in the talking circuit.

When release delay relay 330 operates, contacts 331 open thus restoring supervisory relay 360 while contacts 332 close to operate supervisory relay 350. Contacts 336 close to apply still another busy marking of ground potential to sleeve conductor S2. When release delay relay 330 closes its contacts 333, it not only completes a circuit over the talking conductors but also it operates supervisory relay 320 over a circuit which may be traced from tip conductor T through rest contacts 242', 224, operated contacts 353, the winding of supervisory relay 320, operated contacts 311, operated contacts 333, rest contacts 226 and 245, to conductor R.

When supervisory relay 320 operates, relay 350 is locked in its operated condition over a circuit extending from ground (+) via contacts 321 and 355 to (—) battery through the winding of relay 350. Parenthetically, it might be explained that supervisory relay 350 was originally operated (as explained above) by supervisory relay 360 which has restored; however, before relay 350 may restore, due to its own slow release characteristics, supervisory relay 320 completes the new locking circuit at contacts 321.

The circuit is now ready for conversation which may follow.

*Release.*—The particular circuit operations which occur during release depend upon which subscriber disconnects first. If it is assumed that the distant office disconnects first, the loop across conductors T and R (trunk TK31) is opened so that supervisory relay 320 is restored. It might be recalled that the circuit for this relay has been extended from conductor T through rest contacts 242', 224, 353, the winding of supervisory relay 320, operated contacts 311, 333, rest contacts 226, 245, and conductor R to the distant office. When relay 320 restores, contacts 321 open, thereby breaking the circuit including contacts 355 over which supervisory relay 350 had been holding in an operated condition.

Upon restoring, supervisory relay 350 opens its contacts 351, thereby extinguishing busy lamp BY21. Also, a circuit is closed to operate shunt relay 340 which may be traced from (—) battery through the winding of relay 340, operated contacts 334, and rest contacts 357 to ground (+).

When shunt relay 340 operates, it opens contacts 343, thereby preventing a reoperation of ring relay 250 until the circuit is completely restored. Contacts 341 close to complete a circuit which shunts the winding of supervisory relay 320, thus rendering it inoperative until the call is completely released. Ground is extended over ring conductor R to the distant office for signaling a release to equipment there, the circuit being traced from ground (+) through contacts 342, 352, 341, 311, 333, 226, 245, and conductor R. This signal causes equipment (not shown) in the distant office to respond and return a ground potential over conductor T. The signal to the distant office, i.e., the ground potential which is transmitted over conductor R, is also effective for marking the distant end of trunk line TK31 as busy until release is completed.

Relay 350 reoperates over a circuit which may be traced from (—) battery through the winding of relay 350, contacts 354, 332, and tip conductor T to ground (+) (not shown) in the distant office. Immediately upon operating, supervisory relay 350 opens contacts 354; however, its slow release characteristics are such that it holds until a circuit is completed to extend ground (+) from contacts 342 through contacts 355 and the winding of relay 350 to (—) battery. Supervisory relay 350 closes contacts 351 thereby relighting busy lamp BY21 to indicate that the trunk may not be used as yet. Contacts 357 open thereby breaking the energizing circuit to shunt relay 340 which restores after expiration of its slow release time interval, whereupon contacts 342 open thereby breaking a circuit to supervisory relay 350. Contacts 341 open to remove the shunt from around relay 320, allowing it to reoperate in series with the battery extended over conductors T and R. Ground (+) is now extended from contacts 321 through contacts 355 and the winding of supervisory relay 350 to (—) battery. The circuit remains in the condition described until the attendant disconnects.

The only disconnect supervision which the attendant receives is extended under control of a local subscriber, whereupon the attendant removes a plug (not shown) from jack J21 thereby breaking a circuit including conductor S1 which had been holding sleeve relay 210 in an operated condition. Contacts 212 open to break one of the paths to busy lamp BY21; however, it is still lit by current flowing in the circuit which is completed through contacts 351. Contacts 214 open to remove a busy marking from selector bank access SB21. Removal of a plug from jack J21 also breaks a loop circuit extending to calling bridge relay 310 that releases and opens contacts 312 to de-energize release delay relay 330, which has slow release characteristics. When contacts 313 close, shunt relay 340 operates over a circuit which may be traced from (—) battery through the winding of relay 340, operated contacts 334, resting contacts 247 and 313 to ground (+). Contacts 342 close thereby completing an alternate circuit through contacts 355 for supervisory relay 350. Again, contacts 341 close to shunt and therefore release supervisory relay 320.

When supervisory relay 320 restores, contacts 321 open thereby breaking an alternate circuit for supervisory relay 350.

After a while, the slow release time period of release delay relay 330 expires and contacts 334 open, thus de-energizing shunt relay 340 which also has a slow release time period.

After still another brief time period, relay 340 releases and opens contacts 341 and 342. Contacts 342 break a holding circuit to supervisory relay 350 which releases, contacts 332 being then open. The ground signal that was transmitted (as explained above) over conductor R to the distant office for marking trunk line TK31 as busy is now removed. The circuit is now normal and ready for another call.

*Attendant disconnects first.*—It is now assumed that the call may be disconnected first at the attendant cabinet, as by the removal of a plug (not shown) from jack J21, for example. Responsive thereto, the loop circuit extending to calling bridge relay 310 is broken, thus causing it to restore. Contacts 312 open, thereby de-energizing release delay relay 330, which has slow release characteristics. Contacts 313 close thereby completing a circuit during the slow release time of relay 330 to operate shunt relay 340, the circuit extending from (−) battery through the winding of relay 340, operated contacts 334, rest contacts 247 and 313 to ground (+). Contacts 311 open thereby breaking both the talking circuit and a circuit which extends through the winding of supervisory relay 320. Incidentally, contacts 311 also open the loop which extends to the distant office over trunk TK31 thereby restoring equipment at that office.

Sleeve relay 210 restores when the circuit to conductor S1 is broken as the attendant disconnects. Responsive to the restoration of relay 210, contacts 212 open to extinguish busy lamp BY21. Contacts 214 open to remove one of the busy markings which had been extended to selector bank access SB21 over sleeve conductor S2.

When shunt relay 340 operates, as explained above, a circuit is completed at contacts 342 for operating supervisory relay 350. Contacts 341 close for shunting the winding of supervisory relay 320, thus causing it to restore.

Responsive to the restoration of relay 320, contacts 321 open to break the last circuit for holding supervisory relay 350. The circuit is now returned to normal and nothing further happens until the next call.

OUTGOING CALL EXTENDED THROUGH SELECTOR BANK ACCESS SB21

Figures 1, 4:
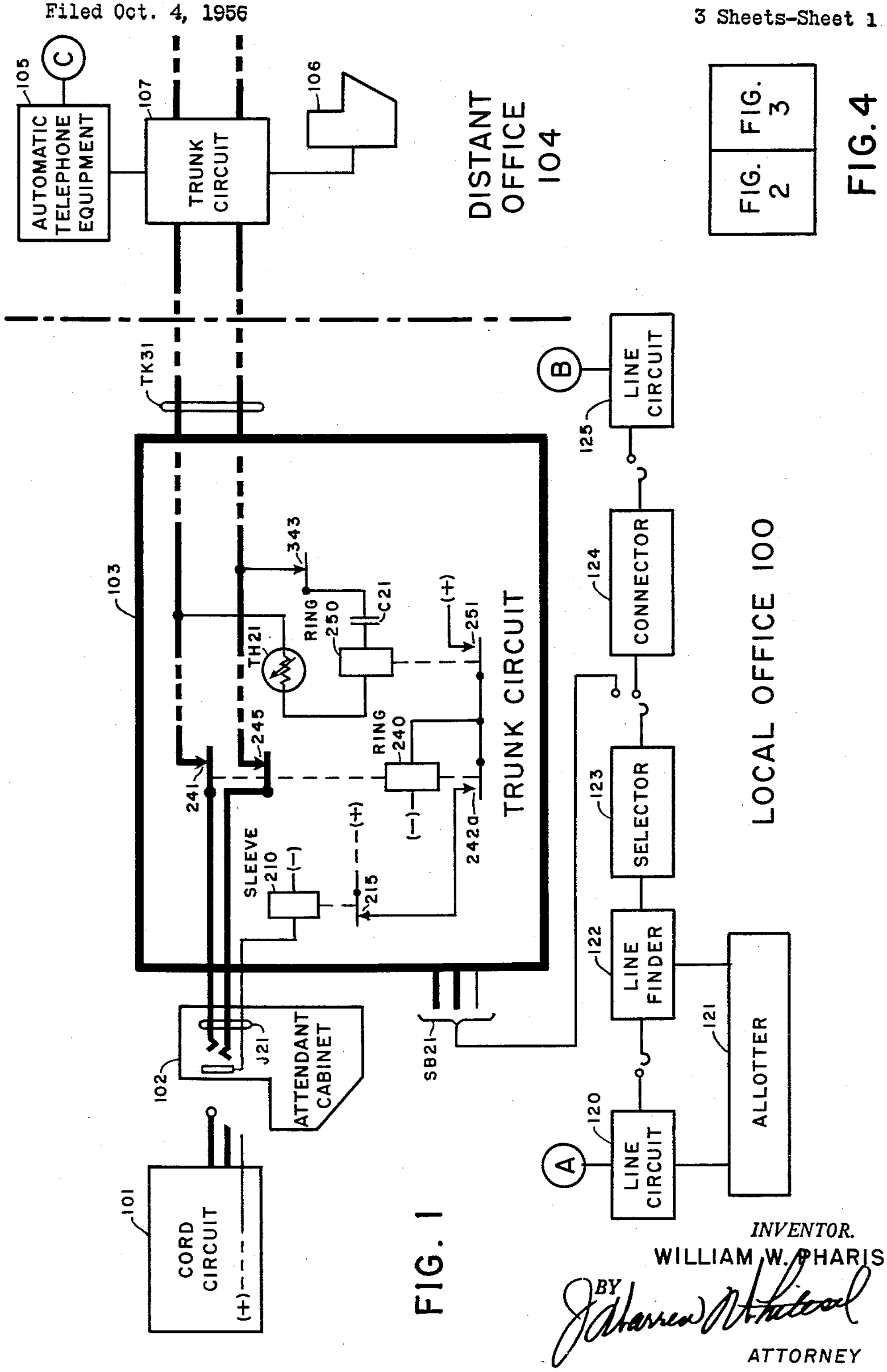

Next, it is assumed that a subscriber at station A (Fig. 1) in the local office 100 wishes to extend a call over trunk line TK31 to distant office 104. To do so, any suitable equipment may direct selector 123 to seize access SB21 and conductors T2, R2 and S2 (Fig. 2). Responsive thereto, calling bridge relay 310 is operated over a circuit which may be traced from ground (+) through the upper winding of relay 310, rest contacts 241, conductor T2, a loop extending through preceding equipment and returning over conductor R2, rest contacts 243, and the lower winding of calling bridge relay 310 to (−) battery. Calling bridge relay 310 operates and closes contacts 312 thereby operating release delay relay 330 over an obvious circuit. Contacts 311 also close to prepare part of the talking circuit. When release delay relay 330 operates, it closes contacts 338 thereby preparing a locking circuit for sleeve relay 230. Contacts 336 close thereby extending ground (+) through the upper winding of sleeve relay 230 to conductor S2, which may be connected to a (−) battery potential (not shown) in a preceding circuit. Contacts 334 close thereby operating shunt relay 340 over a circuit which may be traced from (−) battery through the winding of shunt relay 340, contacts 334 and 357 to ground (+).

Sleeve relay 230 operates responsive to closure of contacts 336, as explained above. Responsive thereto, "X" contacts 234 are the first to close thereby completing a locking circuit which may be traced from ground (+) on contacts 338, through contacts 234 and the lower winding of sleeve relay 230 to (−) battery. Perhaps it may be desirable to provide relay 230 with an upper winding having an extremely low resistance; therefore, contacts 233 may be adapted to complete a shunt around the upper, low resistance, winding of sleeve relay 230 for reducing excessive current drain. Contacts 231 close for lighting busy lamp BY21 over a circuit that extends from (−) battery through operated contacts 231 and the filament of busy lamp BY21 to ground (+). Contacts 232 open to break the circuit to incoming lamp 121 since it is not required on this call.

When shunt relay 340 operates, contacts 341 close to shunt the winding of relay 320, thus causing it to release. A seizure signal may be transmitted to the distant office over trunk line TK31 in the form of a ground (+) marking which is connected to conductor R via the circuit extending from ground (+) at contacts 342, over contacts 352, 341, 311, 226, 245 and conductor R to the distant office. Any suitable equipment such as "Automatic Telephone Equipment 105" (Fig. 1), for example, in the distant office may operate to extend a call. Responsive thereto, equipment in the distant office may extend a ground (+) marking over conductor T thereby operating supervisory relay 350 over a circuit which may be traced from conductor T through operated contacts 332, 354, and the winding of supervisory relay 350 to (−) battery.

When supervisory relay 350 operates, it closes contacts 351 thereby completing still another circuit for lighting busy lamp BY21. Contacts 353 close for completing still another point in the talking circuit, and contacts 357 open, thus de-energizing shunt relay 340 which restores after the expiration of its slow release time period. Contacts 356 close to extend a busy and holding marking over sleeve conductor S2.

After the expiration of its slow release time period, shunt relay 340 releases, as explained above. Responsive to the restoration of shunt relay 340, contacts 342 open to break a locking circuit which had been extended to supervisory relay 350; however, this relay has slow release characteristics so that it continues to hold until a new locking circuit is completed. When contacts 341 open, supervisory relay 320 is unshunted and operates over the circuit extending from conductor T, through rest contacts 242', 224, 353, the winding of relay 320, operated contacts 311, 333, rest contacts 226, 245, and conductor R to (−) battery in the distant office (not shown).

When supervisory relay 320 operates, contacts 321 are closed thereby completing a locking circuit for holding supervisory relay 350.

The circuit is now ready for dialing as indicated by dial tone which may be returned over trunk TK31 from the distant office. Nothing further happens until the calling subscriber dials.

*Dialing.*—Upon hearing dial tone, the calling subscriber proceeds to transmit a series of open loop impulses by any suitable means, such as by a dial at the calling telephone (not shown). It might be recalled that calling bridge relay 310 is holding operated over a circuit including a loop which may be completed from conductor T2 to conductor R2 via impulsing contacts in the aforementioned dial. As the dial is operated by the calling subscriber, this loop between conductors T2 and R2 may be broken a number of times to indicate a numerical value of the digits as they are transmitted. Responsive to each break or open loop pulse, calling bridge relay 310 restores and upon completion of that break or open loop pulse, calling bridge relay 310 reoperates. Each time calling bridge relay 310 restores and reoperates, contacts 312 open and close to de-energize and re-energize release delay relay 330 which, however, continues to hold due to its slow release characteristics. When contacts 313 close responsive to receipt of the first digit pulse in a pulse train, shunt relay 340 operates over a circuit which may be traced from ground (+) and through rest contacts 313, 247, operated contacts 334 and the winding of shunt relay 340 to (−) battery.

Shunt relay 340 closes contacts 341, thereby completing a metallic circuit around the winding of supervisory relay 320 thus removing its inductive effect from the pulsing circuit. Again, the holding circuit for supervisory relay 350 is transferred from contacts 321 (as relay 320 restores) to contacts 342 (when relay 340 operates).

As calling bridge relay 310 responds to the digit pulses that are received, contacts 311 are alternately opened and closed to repeat the digit pulses to the distant office over the circuit extending from conductor R through contacts 245, 226, 333, 311, 341, 353, 224, 242' and conductor T. The spark protection network SP is connected in parallel with contacts 311 to reduce wear and pitting. Upon completion of the first digit pulse train, calling bridge relay 310 remains in an operated condition; contacts 312 remain closed thus holding release delay relay 330 in an energized position; and contacts 313 remain open for a period which is longer than the slow release time of shunt relay 340 thereby allowing it to release. Subsequent digit pulse trains are transmitted in a similar manner.

*Answer of call.*—When the call is answered by a central office operator or called party, no supervision is returned. For supervision, the local selector and associated equipment, shown in Fig. 1 as items 120–123, depend entirely upon action by a calling subscriber at station A.

*Release.*—The circuit may be released under control of the local or calling party. When the calling party disconnects, calling bridge relay 310 releases to open its contacts 312 and close its contacts 313. Responsive thereto, shunt relay 340 operates over a circuit including ground (+), contacts 313, 247, 334, and the winding of shunt relay 340 to (−) battery. Release delay relay 330 restores after a slow release time period. Contacts 334 open and after still another slow release time period, shunt relay 340 restores. It might be well to point out that shunt relay 340 was operated at this time to extend a busy marking to the distant office during the release period. Contacts 311 open to break the loop that extends to the distant office, thereby giving disconnect supervision, as required.

The circuit is now returned to normal and ready for another call.

CALL FROM ATTENDANT'S CABINET

Calls may also be extended from the attendant's cabinet over trunk line TK31 to the distant office. These calls involve circuit operations which are substantially the same as those operations which were described above in connection with calls extended over selector bank access SB21. That is, when an attendant or operator plugs into jack J21, a loop is completed for operating calling bridge relay 310. Another circuit is completed for operating sleeve relay 210 whereupon suitable busy markings are transmitted at contacts 212 and 214. When the attendant dials or keys, calling bridge relay 310 repeats the various digit pulses to the distant office thereby controlling suitable automatic equipment, as required. Release is under control of the attendant and is completed in a manner similar to that described above.

While the foregoing specification and accompanying drawings have shown a single embodiment of the invention, other modifications may occur to those skilled in the art. Therefore, the appended claims are not limited to the specific arrangement shown and described, but are intended to cover all modifications which fall within the true spirit and scope of the invention.

What is claimed is:

1. In a telephone system, means comprising talking conductors connected to extend calls between at least two points, first means for extending one or more bursts of ringing current from a first of said points over at least one of said talking conductors, second means when activated for rendering said first means inoperative, third means responsive to the receipt of said ringing current for disconnecting said talking conductors from said second point until the activation of said second means, and answering means effective when operated for activating said second means for causing said third means to release and reconnect said talking conductors to said second point.

2. In a telephone system, means comprising talking conductors connected to extend calls between at least two points, first means for extending one or more bursts of ringing current from a first of said points over at least one of said talking conductors, second means when activated for rendering said first means inoperative, third means responsive to the receipt of said ringing current for disconnecting said talking conductors from said second point until the activation of said second means, signaling means operative in response to said ringing current for indicating that a call is being forwarded on said talking conductors, and answering means responsive to the operation of said signaling means and effective when operated for activating said second means and for causing said third means to release and reconnect said talking conductors to said second point.

3. In a telephone system, a trunk circuit, talking conductors extending through said trunk circuit, means for extending calls over said talking conductors to said trunk circuit, means connected to said talking conductors for answering said calls extending over said talking conductors, means for extending interrupted ringing current over said talking conductors to said trunk circuit, means responsive to the receipt of said ringing current for signaling the presence of unanswered calls, first, second and third switching means, said first switching means operative when said ringing current is present on said talking conductors, said third switching means being operative in response to the operation of said means for answering, said second switching means being responsive to the operation of said first switching means for blocking the passage of ringing current to said answering means, means coupled to said third switching means for maintaining the operation of said second switching means once said second switching means becomes initially operated until the operation of said third switching means.

4. A telephone system comprising two offices interconnected by a trunk line, a trunk circuit connected to said trunk line in a first of said offices, means for transmitting interrupted ringing current over said trunk line from said second office to said trunk circuit, an attendant's cabinet in said first office, answering means for extending a connection from said attendant's cabinet to said trunk line via said trunk circuit, means in said trunk circuit including a first relay for operating and releasing responsive to receipt of said interrupted ringing current, second relay means in said trunk circuit, means responsive to said operation of said first relay for operating said second relay means, means responsive to operation of said second relay for blocking the transmission of said ringing current to said attendant's cabinet, a locking circuit for said second relay, means responsive to operation of said second relay for completing said locking circuit, whereby said second relay remains operated independently of said first relay as it operates and releases responsive to said interruptions of said ringing current, and means responsive to the operation of said answering means for breaking said locking circuit thereby releasing said second relay immediately if said first relay is not then operated by said ringing current and releasing said second relay at the next interruption of ringing current if said first relay is then operated by ringing current.

5. A telephone system comprising two offices interconnected by a trunk line, a trunk circuit connected to said trunk line in a first of said offices, means for transmitting interrupted ringing current over said trunk line from said second office to said trunk circuit, an attendant's cabinet in said first office, answering means for extending a connection from said attendant's cabinet to said trunk line via said trunk circuit, means in said trunk circuit including a first relay for operating and releasing responsive to receipt of said interrupted ringing current, second relay means in said trunk circuit, means responsive to operation of said first relay for operating said second relay means, means responsive to operation of said second relay for disconnecting said trunk line from said attendant's cabinet thereby blocking transmission of said ringing current to said attendant's cabinet, a locking circuit for said second relay, means responsive to operation of said second relay for completing said locking circuit, whereby said second relay remains operated independently of said first relay as it operates and releases responsive to said interruptions of said ringing current, means responsive to the operation of said answering means for breaking said locking circuit thereby releasing said second relay immediately if said first relay is not then operated by said ringing current and releasing said second relay at the next interruption of ringing current if said first relay is then operated by ringing current, and means responsive to release of said second relay for reconnecting said trunk line to complete a talking circuit to said attendant's cabinet.

6. A telephone system comprising two offices interconnected by a trunk line, a trunk circuit connected to said trunk line in a first of said offices, means for transmitting interrupted ringing current from the other of said offices over said trunk line to said trunk circuit, means in said trunk circuit including a first relay for operating and releasing responsive to said interrupted ringing current, second relay means in said trunk circuit, means responsive to operation of said first relay for operating said second relay means, means responsive to operation of said second relay for blocking transmission of said ringing current through said trunk circuit, a locking circuit for said second relay, means responsive to operation of said second relay for completing said locking circuit whereby said second relay remains operated independently of said first relay as it operates and releases responsive to said interruptions of said ringing current, means in said first office for extending a connection to said trunk line via said trunk circuit and means responsive to the operation of said connection extending means for breaking said locking circuit thereby releasing said second relay immediately if said first relay is not then operated by said ringing current and releasing said second relay at the next interruption of ringing current if said first relay is then operated by ringing current.

7. A telephone system comprising two offices interconnected by a trunk line, a trunk circuit connected to said trunk line in a first of said offices, means for transmitting interrupted ringing current from the other of said offices over said trunk line to said trunk circuit, means in said trunk circuit for responding to said interrupted ringing current, means responsive to operation of said means for responding to ringing current for operating a relay, means responsive to operation of said relay for blocking transmission of said ringing current through said trunk circuit, a locking circuit for said relay, means responsive to operation of said relay for completing said locking current, whereby said relay remains operated independently of said means for responding to ringing current, means in said first office operative for extending a connection to said trunk line and means responsive to the operation of said call extending means for breaking said locking circuit thereby releasing said relay immediately if said means for responding to ringing current is not then operated by said ringing current and releasing said relay at the next interruption of said ringing current if said means for responding to ringing current is then operated by said ringing current.

8. A telephone system comprising two offices interconnected by a trunk line, means for terminating said trunk in a first of said offices, means for transmitting interrupted ringing current from the other of said offices over said trunk line to said means for terminating said trunk, means in said terminating means for responding to said ringing current, means responsive to the operation of said last named means for blocking the transmission of said ringing current through said terminating means, means for locking said last named means responsive to its operation whereby said last named means is held independently of said means for responding to said ringing current means in said first office for extending a connection to said trunk line and means responsive to the operation of said connection extending means for breaking said locking means thereby releasing said last named means immediately if said means for responding to ringing current is not then responding and releasing said last named means at the next interruption of ringing current if said means for responding to ringing current is then responding.

References Cited in the file of this patent

UNITED STATES PATENTS

| | | |
|---|---|---|
| 1,700,320 | Larsen | Jan. 29, 1929 |
| 2,380,232 | Gillings et al. | July 10, 1945 |
| 2,468,305 | Newell | Apr. 26, 1949 |